United States Patent
Gessner et al.

(10) Patent No.: US 11,490,633 B1
(45) Date of Patent: Nov. 8, 2022

(54) CANDY BAR HAVING MULTIPLE FILLINGS

(71) Applicants: Robert Joseph Gessner, Culpeper, VA (US); Mulford Henry Smith, III, Culpeper, VA (US)

(72) Inventors: Robert Joseph Gessner, Culpeper, VA (US); Mulford Henry Smith, III, Culpeper, VA (US)

(*) Notice: Subject to any disclaimer, the term of this patent is extended or adjusted under 35 U.S.C. 154(b) by 0 days.

(21) Appl. No.: 17/228,272

(22) Filed: Apr. 12, 2021

Related U.S. Application Data

(60) Provisional application No. 63/083,596, filed on Sep. 25, 2020.

(51) Int. Cl.
    *A23G 1/54*     (2006.01)
    *A23G 3/54*     (2006.01)

(52) U.S. Cl.
    CPC .............. *A23G 1/545* (2013.01); *A23G 3/545* (2013.01)

(58) Field of Classification Search
    CPC ................................ A23G 1/545; A23G 3/545
    USPC .......................................................... 426/76
    See application file for complete search history.

(56) References Cited

U.S. PATENT DOCUMENTS

| | | | |
|---|---|---|---|
| 4,229,484 A | * | 10/1980 | Steels ................. A23G 3/2023 426/103 |
| 6,759,079 B2 | | 7/2004 | Klug et al. |
| D809,240 S | | 2/2018 | Astheimer et al. |
| 10,058,108 B2 | | 8/2018 | Bufton et al. |
| 2008/0050484 A1 | | 2/2008 | Kijowski et al. |
| 2015/0327569 A1 | | 11/2015 | Kessell |
| 2016/0302441 A1 | * | 10/2016 | Wood .................. A23G 3/0065 |
| 2017/0119010 A1 | | 5/2017 | Naidu-Husband et al. |

FOREIGN PATENT DOCUMENTS

| | | | |
|---|---|---|---|
| BE | 1009616 | 6/1997 | |
| BE | 1009616 A6 * | 6/1997 | ............... A23G 1/54 |
| CA | 2269411 | 10/1999 | |
| EP | 1994833 | 11/2008 | |
| GB | 2432773 | 6/2007 | |
| WO | 1999040800 | 8/1999 | |

\* cited by examiner

*Primary Examiner* — Jyoti Chawla

(57) ABSTRACT

The present invention is directed toward a candy bar that is designed to offer a consumer a different flavor profile with each bite of the candy bar. The candy bar may be an elongate member having a horizontal length. More specifically, the candy bar may be configured to contain a plurality of cavities within each bar, wherein each cavity includes a filling that is different from the filling of at least one other cavity of the plurality of cavities.

13 Claims, 6 Drawing Sheets

CANDY BAR HAVING MULTIPLE FILLINGS

CROSS-REFERENCE TO RELATED APPLICATIONS

This application claims the benefit of U.S. Provisional Patent Application No. 63/083,596, filed on Sep. 25, 2020, which is incorporated by reference herein in its entirety.

FIELD OF THE INVENTION

The present invention relates generally to edible material. More particularly, the present invention relates to a candy bar having a plurality of cavities with a variety of fillings. Each cavity of the candy bar is intended to be eaten in a single bite-size portion. Such an arrangement allows a user to experience a different flavor profile with each bite.

BACKGROUND OF THE INVENTION

Anthropologists believe that Mesoamerican cultures dating back to 1900 B.C. regularly ground up cacao beans into a paste, which they would mix with water and a variety of spices in order to make a flavorful beverage. The Aztecs, Mayans, and Olmecs all believed chocolate to be a mood enhancer and aphrodisiac fit for a variety of special occasions, including weddings, other major celebrations, and funerals.

Mesoamerican cultures continued to enjoy chocolate in liquid form well into the 1500s, when the Spanish colonizer Hernán Cortés sampled the drink and decided to bring it back with him to Spain. Spanish royalty altered the recipe of chocolate by mixing the cacao paste with cane sugar and cinnamon. The drink was popular among wealthy Spaniards until the early $17^{th}$ century, when the drink spread across Europe among wealthy elites. It remained this way for centuries.

Up to and including the 19th century, confectionery of all sorts was typically sold in small pieces to be bagged and bought by weight. The introduction of chocolate as something that could be eaten as is, rather than used to make beverages or desserts, resulted in the earliest bar forms, or tablets. At some point, chocolates came to mean any chocolate-covered sweets, whether nuts, creams, caramel candies, or others. The chocolate bar evolved from all of these in the late-19th century as a way of packaging and selling candy more conveniently for both buyer and seller; however, the buyer had to pay for the packaging. It was considerably cheaper to buy candy loose, or in bulk.

In 1847, Joseph Fry discovered a way to mix the ingredients of cocoa powder, sugar and cocoa to manufacture a paste that could then be molded into a solid chocolate bar for consumption. A variety of innovations quickly followed Fry's initial invention. John Cadbury began producing a similar creation in 1849; Henry Nestle started adding milk to the original recipe in 1875; and in 1879 Rudolphe Lindt figured out how to produce chocolate bars that better held their shape and boasted a creamier texture than the original versions. Producers soon began combining chocolate with other ingredients such as nuts, fruit, caramel, nougat, marshmallows, toffee, and wafers. Approximately 30,000 varieties of candy bars existed in the United States during the 1920's, most of which were produced locally.

The original chocolate makers held on to their industry reign for quite some time, but more recent decades have witnessed the rise of independent chocolate makers looking to improve on the classics. Artisan chocolate makers have breathed new life into the industry with innovative flavor combinations, a renewed commitment to quality, and a focus on ethical sourcing and production practices. More specifically, artisanal cholate makers have devised new flavors and filling found within candy bars that are unique and not common when candy bars were originally brought forth to the market.

Despite the recent advancements in the chocolate industry, there remains little on the market that offers consumers the ability to sample a variety of flavor profiles within a single chocolate bar. Additionally, there remains little on the market that is designed to provide a consumer with a variety of bite-sized sections allowing a consumer to save the bar for future consumption. Accordingly, there remains a need in the art for a solution to at least one of the aforementioned problems. For instance, a candy bar that allows a consumer to sample a variety of different flavor profiles within a single bar is desired. It is also desired to provide a candy bar that may be designed for future consumption.

SUMMARY OF THE INVENTION

The present invention is directed to a candy bar configured to allow multiple types of fillings within a single bar. More specifically, the candy bar allows the person consuming the bar to be able to enjoy a new, unique flavor profile with each bite. The candy bar may include an elongate member and a plurality of cavities formed within the elongate member. Additionally, each cavity of the plurality of cavities may be configured to hold a filling. The filling of each of the plurality of cavities may be different to at least one of the remaining cavities of the plurality of cavities. A method for eating the candy bar is also provided.

The candy bar may provide a number of improvements over conventional candy bars. Firstly, each cavity may have a filling that is unique or at least different from each of the remaining cavities, allowing a person to enjoy multiple flavors within a single candy bar. Secondly, the unique fillings of each cavity may be bite-size such a person may be able to enjoy a unique flavor profile with each bite. Lastly, the current candy bar may be cost effective by providing multiple flavors with the same outer substance.

In a first implementation of the invention, a candy bar comprises:
- an elongate member, the elongate member having a horizontal length; and
- a plurality of cavities formed within the elongate member along the horizontal length, each cavity of the plurality of cavities configured to hold a filling; wherein
- the filling of each cavity of the plurality of cavities is different to the filling of the at least one cavity of the remaining cavities of the plurality of cavities.

In a second aspect, the elongate member may have a rectangular shape.

In another aspect, the elongate member may have an outer shell.

In another aspect, the outer shell may be comprised of chocolate.

In another aspect, the outer shell may be comprised of a confection.

In another aspect, the outer shell may include a top surface and a bottom surface.

In another aspect, the elongate member may include a plurality of sections.

In another aspect, the plurality of sections may be defined by a plurality of ridges that run along the horizontal length of the elongate member.

In another aspect, the top surface of each of the plurality of sections may include a convex portion.

In another aspect, the plurality of sections may each include a cavity forming a plurality of cavities along the horizontal length of the elongate member.

In another aspect, the top surface may include a design element configured to serve as an identifier of the filling within each cavity.

In another aspect, each cavity of the plurality of cavities may include a concave portion.

In another aspect, the concave portion may be configured to hold the filling within each cavity.

In another aspect, the filling may be one of fruits, nuts, nougat, or caramel.

In another aspect, the filling may include a combination of fruit, nuts, nougat, or caramel.

In another aspect, the filling may be comprised of the same substance as the outer shell.

In another implementation of the invention, a method of eating the candy bar comprises:

obtaining a candy bar, the candy bar having an elongate member, the elongate member having a horizontal length and a plurality of cavities formed within the elongate member along the horizontal length, each cavity of the plurality of cavities configured to hold a filling wherein the filling of each cavity of the plurality of cavities is different to the filling of the at least one cavity of the remaining cavities of the plurality of cavities; and having a user bite down on an individual cavity such that the user only consumes the individual cavity.

In another aspect, each cavity of the plurality of cavities may be sized such that the cavity may be consumed in a single bite.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a candy bar that is designed to offer a consumer a different flavor profile with each bite of the candy bar. The candy bar may be an elongate member having a horizontal length. More specifically, the candy bar may be configured to contain a plurality of cavities within each bar, wherein each cavity includes a filling that is different from the filling of at least one other cavity of the plurality of cavities.

Figure 1:
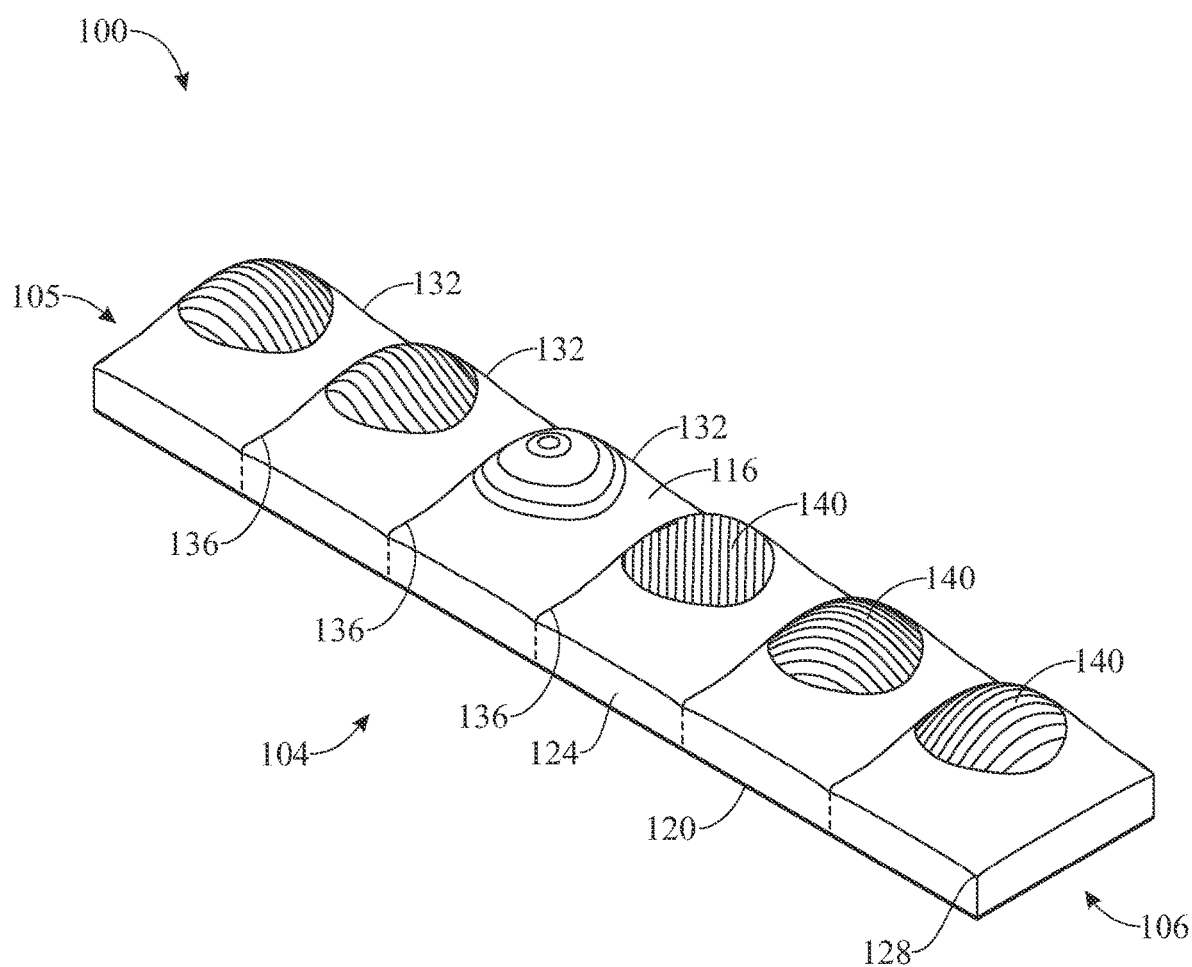
FIG. 1 presents a front isometric view of the candy bar in accordance with a first illustrative embodiment of the invention.
Figure 6:
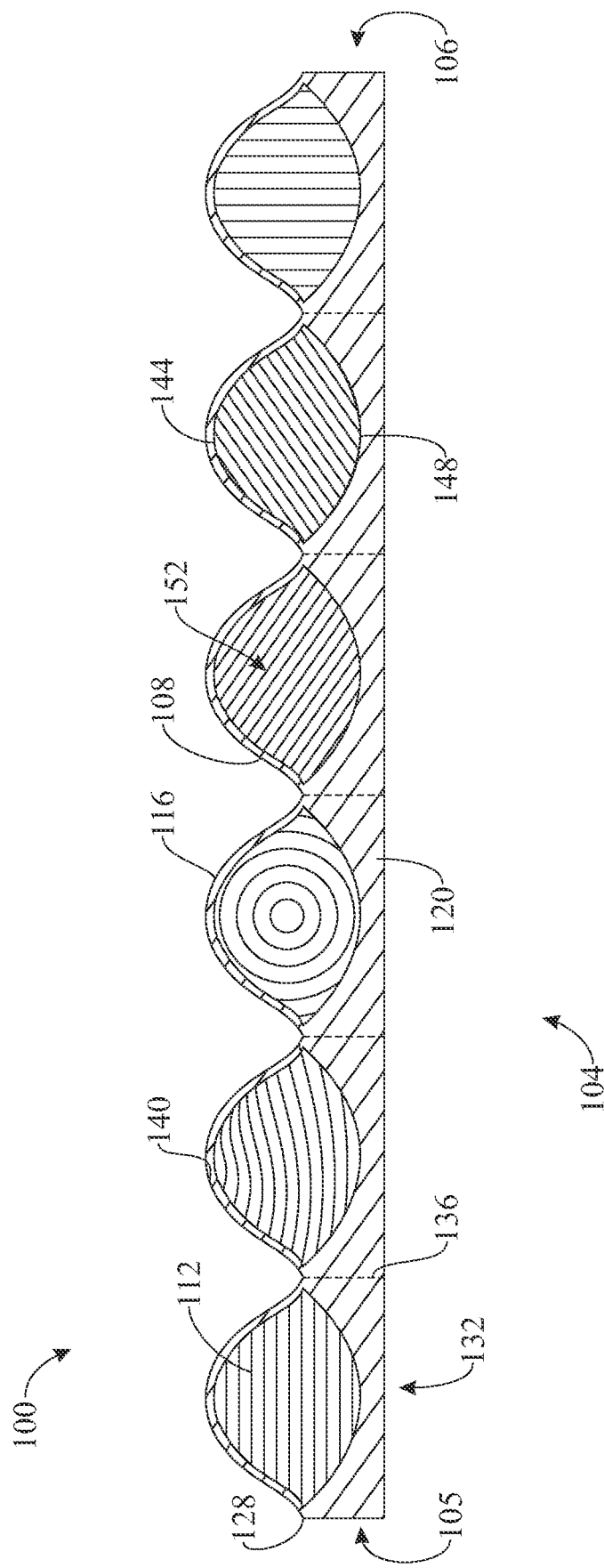
FIG. 6 presents a front view cross sectional view of the candy bar illustrated in FIG. 1.

Referring initially to FIG. 1, a candy bar 100 is illustrated in accordance with an exemplary embodiment of the present invention. As shown, the candy bar 100 includes an elongate member 104 having a horizontal length. The candy bar 100 may also include a plurality of cavities 108 designed to hold a filling 112, as best shown in FIG. 6. As will be described in greater detail hereinafter, the candy bar may be designed and configured to offer a consumer a different flavor profile with each bite of the candy bar 100.

Figure 2:
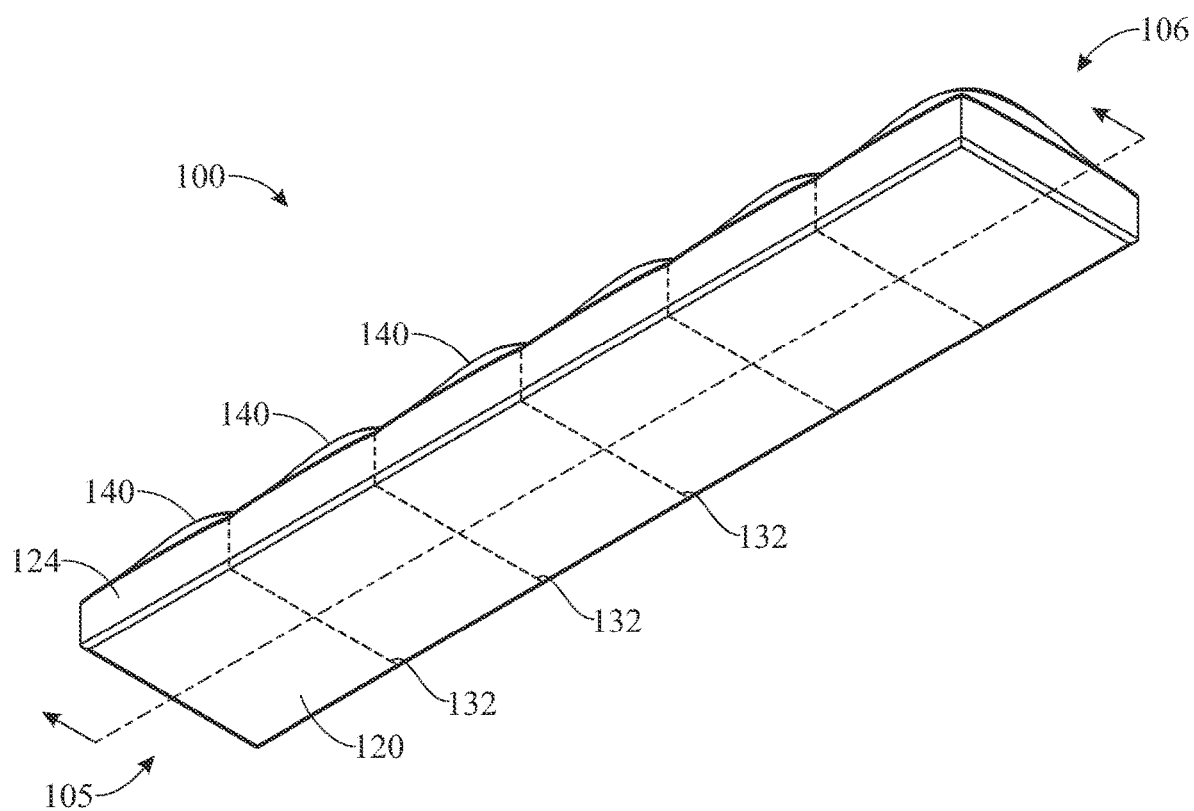
FIG. 2 presents a bottom isometric view of the candy bar illustrated in FIG. 1.

Referring back to FIG. 1, the elongate member 104 may further include a proximal end 105 and a distal end 106 along the horizontal length. The elongate member 104 may be rectangular in shape. Alternatively, embodiments are envisioned in which the elongate member 104 may be other shapes, such as, fix example, circular. Additionally, the elongate member 104 may include a top surface 116 and a bottom surface 120, as best shown in FIG. 1 and FIG. 2. The top surface 116 and bottom surface 120 of the elongate member 104 may be connected to each other by a plurality of side surfaces 124. Referring back to FIG. 1, the top surface 116 and the bottom surface 120 in conjunction with the plurality of side surfaces 124 may further define an outer shell 128 of the elongate member 104. The outer shell 128 may be may be comprised of chocolate. Alternatively, the outer shell 128 may be comprised of any confection.

Figure 3:
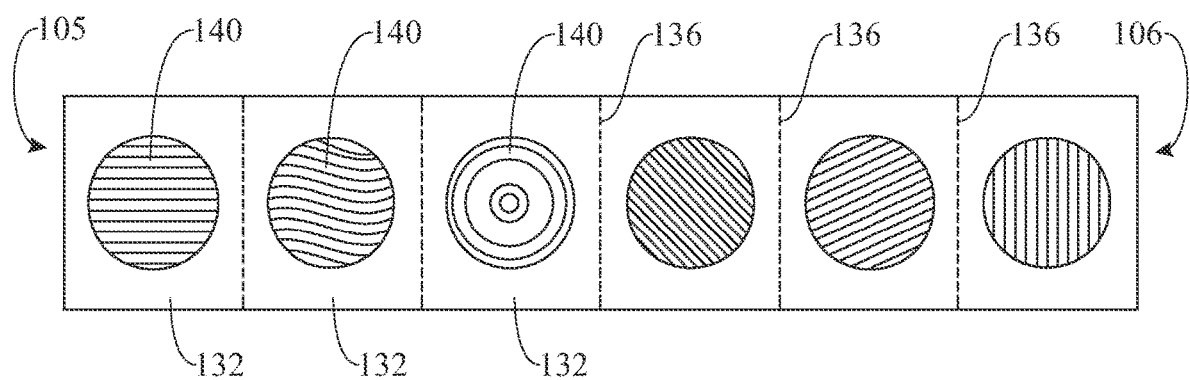
FIG. 3 presents a top view of the candy bar illustrated in FIG. 1.
Figure 4:
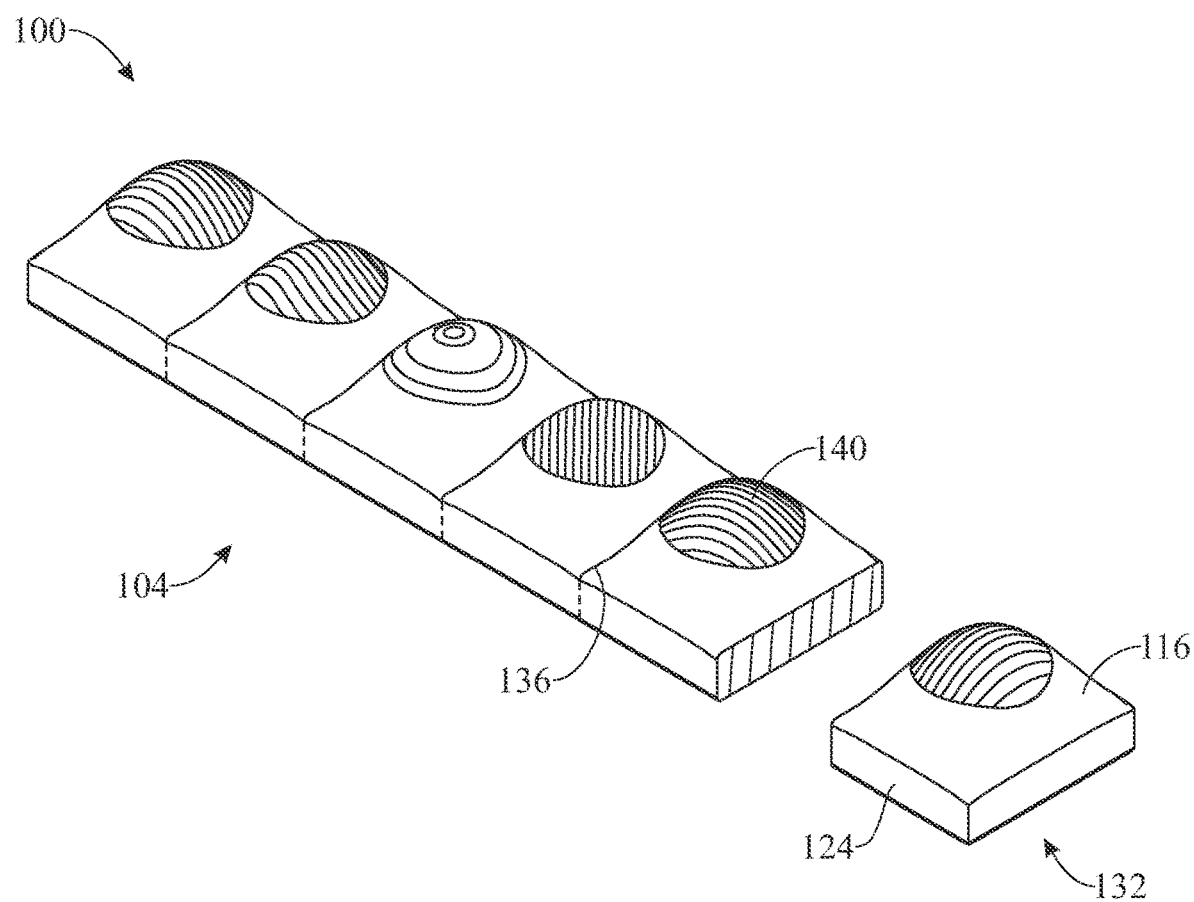
FIG. 4 presents a front isometric view of the candy bar illustrated in FIG. 1, with an individual cavity broken off from the rest of the candy bar.
Figure 5:
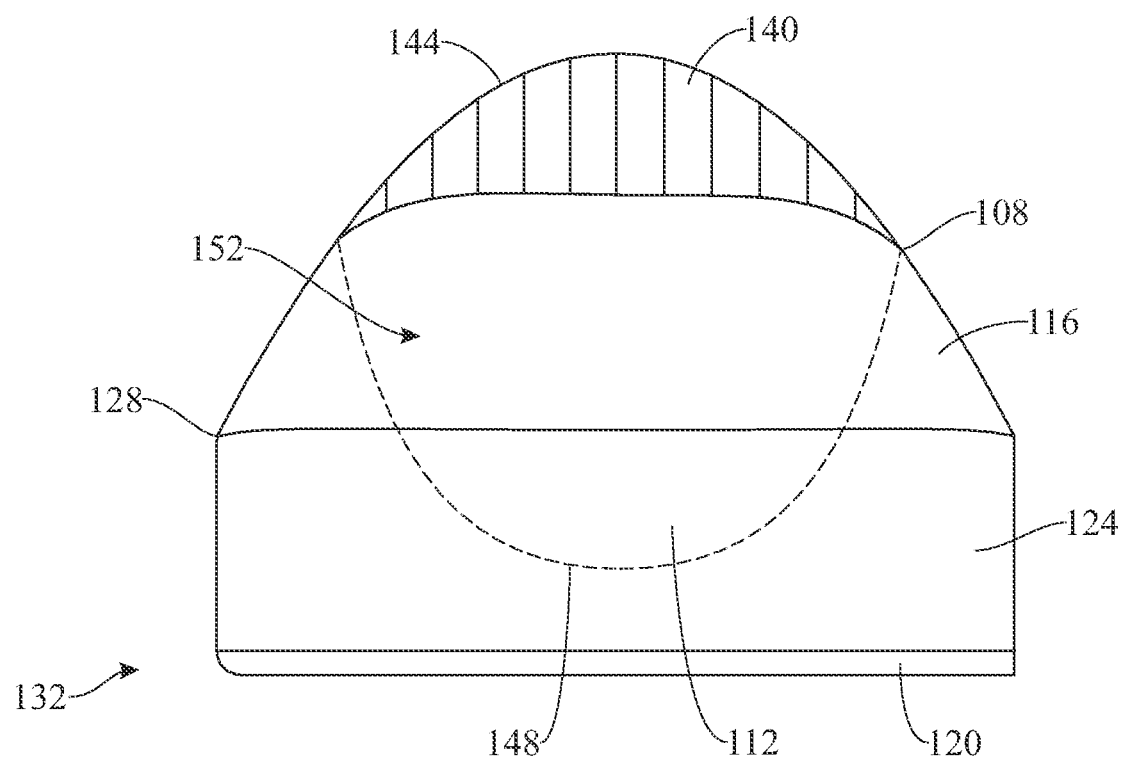
FIG. 5 presents a cross-sectional front view of the individual cavity of the candy bar illustrated in FIG. 4.

The horizontal length of the elongate member 104 may be divided into a plurality of sections 132. The plurality of sections 132 may be defined by a plurality of vertical ridges 136 which run along the entire horizontal length of the elongate member 104 from the proximal end 105 to the distal end 106. The plurality of vertical ridges 136 may be spaced out evenly such that the plurality of sections 132 are each the same size. Alternatively, embodiments are envisioned in which the plurality of ridges 136 may not be equidistant from each other, in which case the plurality of sections 132 may be varying sizes. The vertical ridges 136 may be configured to allow a section 132 of the plurality of sections 132 to be severable from the remaining sections 132 of the plurality of sections 132. As will be described in greater detail hereinafter, the plurality of sections 132 may each include a cavity 108 forming the plurality of cavities 108 along the horizontal length of the elongate member 140, as best shown in FIG. 6. Referring now to FIG. 4, each section 132 of the plurality of sections 132 may be able to be broken off from the elongate member 104. As will be described in greater detail hereinafter, each section 132 may define an individual piece of the candy bar wherein each section 132 or piece includes a filling 112 that is unique from at least one of the remaining sections 132. Referring now to FIG. 3, the top surface 116 of each section 132 of the plurality of sections 132 may include a design element 140. The design element 140 may be configured to identify the filling 112 within each cavity 108 of each section 132. Additionally, each design element 140 along the top surface 116 of the elongate member 104 may include a convex portion 144, as best shown in FIG. 5. As will be described in greater detail hereinafter, the convex portion 144 may be configured to hold a greater amount of filling 112 within each cavity 108.

With continued reference to FIG. 5, each cavity 108 of the plurality of cavities 108 may include concave portion 148. The concave portion 148 may cut into the bottom surface 120 of the outer shell 128. The concave portion 148 of the bottom surface 120 may connect with the convex portion 144 of the top surface 116 to define an interior space 152, as shown in FIG. 6. The interior space 152 may be configured to hold the filling 112. The filling 112 may be one of a type of fruit, a type of nut, nougat, or caramel. Alternatively, the filling 112 may be a combination of a type of fruit, a type of nut, nougat, or caramel. Embodiments are envisioned wherein the filling 112 may be comprised of a number of edible materials found in the art. The filling 112 may also be solid and may be comprised of the same material as the outer shell 128. Additionally, the filling 112 of each cavity 108 of the plurality of cavities 108 may be different to the filling 112 of the at least one cavity 108 of the remaining cavities 108 of the plurality of cavities 108.

The illustrations of FIG. 4 and FIG. 6 represent an example method on consumption of the candy bar 100. Referring initially to FIG. 4, each section 132 of the plurality of sections 132 is configured to hold a single cavity 108 that makes up the plurality of cavities 108. As a result, each section 132 contains exactly one type of filling 112 that is unique from at least one of the other sections 132. A consumer may then choose to consume one particular section 132 of the candy bar 100 by either biting down or breaking off a single a single section 132 by breaking the elongate member 104 at a single vertical ridge 136 at either the proximal end 105 or the distal end 106 of the elongate member 104. Each filling 112 may correspond to a particular design element 140. Thus, a consumer may be able to identify the filling 112 within a particular cavity 108 by the design element 140 on the top surface 116 of each section 132, as shown in both FIG. 4 and FIG. 6. With continued reference to FIG. 6, the filling 112 of each cavity 108 of the plurality of cavities 108 may be different to the filling 112 of the at least one cavity 108 of the remaining cavities 108 of the plurality of cavities 108, allowing the consumer to enjoy a single flavor profile with each individual section 132 of the elongate member. Thus, the sizing of each section 132 may be equal to each of the sections 132 so as to ensure that each section 132 is a bite size portion for the consumer.

Alternative embodiments are contemplated to those shown or described herein without departing from the scope of the present disclosure. For example, embodiments are contemplated in which each section within the elongate member of the candy bar may be a different size. Another alternative embodiment considered is making the general shape of the candy bar something other than rectangular. Lastly, it is contemplated that that the filling within each candy bar may be a combination of different fillings rather than a single type of filling.

In summary, the candy bar disclosed herein provides a consumer with the ability to enjoy different flavor profiles within the same candy bar. The elongate member may include a number of section each having a cavity with a different filling than at least one of the other sections. As a result, the candy bar can offer consumers a variety of flavors within a single bar. Additionally, each section and cavity of the candy bar is sized to be comfortable for a consumer to eat in a single bite, allowing a consumer to enjoy a new flavor profile with each bite.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A candy bar comprising:
an elongate member having a flat bottom surface, the elongate member having a horizontal length and including a plurality of sections; and
a plurality of cavities formed within the elongate member along the horizontal length and within each of the plurality of sections, each cavity of the plurality of cavities including a convex portion and a concave portion defining an interior space, the interior space configured to hold a filling; wherein
the filling of each cavity of the plurality of cavities is different to the filling of at least two cavities of the remaining cavities of the plurality of cavities, and further wherein a top surface of the elongate member includes a design element on each cavity of the plurality of cavities configured to serve as an identifier of said filling within each respective cavity of the plurality of cavities.

2. The candy bar of claim 1, wherein the elongate member exhibits a rectangular shape.

3. The candy bar of claim 2, wherein the outer shell is comprised of chocolate.

4. The candy bar of claim 2, wherein the outer shell is comprised of a confection.

5. The candy bar of claim 2, wherein the outer shell includes a top surface and a bottom surface.

6. The candy bar of claim 1, wherein the elongate member includes an outer shell.

7. The candy bar of claim 1, wherein the plurality of sections are defined by a plurality of vertical ridges that run along the horizontal length of the elongate member.

8. The candy bar of claim 7, wherein the plurality of vertical ridges are configured to allow a section from the plurality of sections to be severable from the remaining sections of the plurality of sections.

9. The candy bar of claim 1, wherein each section of the plurality of sections is the same size.

10. The candy bar of claim 1, wherein the filling is comprised of at least of one of fruits, nuts, nougat, and caramel.

11. The candy bar of claim 1, wherein the filling is comprised of some combination of fruits, nuts, nougat, and caramel.

12. The candy bar of claim 1, wherein each cavity of the plurality of cavities is sized and configured to be consumed in a single bite.

13. A candy bar comprising:
an elongate member having a flat bottom surface, the elongate member having:
an outer shell having a rectangular shape and a horizontal length, wherein the outer shell may be comprised of at least one of a chocolate and a confection;
a plurality of sections defined by a plurality of vertical ridges along the entire horizontal length of the elongate member, wherein a section of the plurality of sections is severable from the remaining sections of the plurality of sections along each of the plurality of vertical ridges, and further wherein each section of the plurality of sections is sized and configured to be consumed in a single bite;
a plurality of cavities formed within the elongate member along the horizontal length, wherein each of the cavities of the plurality of cavities includes a concave portion and a convex portion; and
an interior space formed within each cavity of the plurality of cavities, wherein the interior space is further defined by an area in between the concave portion and the convex portion where the concave portion and the convex portion meet, and further wherein the interior space is configured to hold a filling; wherein
the filling of each cavity of the plurality of cavities being different to the filling of the at least two cavities of the remaining cavities of the plurality of cavities, wherein the filling of each may be comprised of at least of fruits, nuts, nougat, and caramel or some combination thereof, and further wherein a top surface of each cavity of the plurality of cavities of the elongate member includes a design element configured to serve as an identifier of said filling within each cavity of the plurality of cavities.

* * * * *